(12) United States Patent
Ito

(10) Patent No.: US 8,954,970 B2
(45) Date of Patent: Feb. 10, 2015

(54) DETERMINING EXECUTABLE PROCESSES BASED ON A SIZE OF DETECTED RELEASE-FORGOTTEN MEMORY AREA AND SELECTING A NEXT PROCESS THAT ACHIEVES A HIGHEST PRODUCTION QUANTITY

(75) Inventor: Motohisa Ito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1194 days.

(21) Appl. No.: 12/511,935

(22) Filed: Jul. 29, 2009

(65) Prior Publication Data

US 2010/0031264 A1 Feb. 4, 2010

(30) Foreign Application Priority Data

Jul. 31, 2008 (JP) ................................. 2008-198620

(51) Int. Cl.
*G06F 9/46* (2006.01)
*G06F 12/00* (2006.01)
*G06F 9/50* (2006.01)
*G06F 12/02* (2006.01)

(52) U.S. Cl.
CPC ............ *G06F 9/5016* (2013.01); *G06F 9/5038* (2013.01); *G06F 12/0253* (2013.01); *Y02B 60/142* (2013.01); *G06F 2209/504* (2013.01)
USPC ............................. 718/102; 718/100; 711/170

(58) Field of Classification Search
None
See application file for complete search history.

(56) References Cited

U.S. PATENT DOCUMENTS

| 7,398,369 | B2 * | 7/2008 | Dickenson ..................... 711/170 |
| 8,046,086 | B2 * | 10/2011 | Pettus et al. ....................... 700/9 |
| 2007/0136402 | A1 * | 6/2007 | Grose et al. ................... 707/206 |

FOREIGN PATENT DOCUMENTS

| JP | 11-176717 | 7/1999 |
| JP | 2000-293400 A | 10/2000 |
| JP | 2002-108698 | 4/2002 |

* cited by examiner

*Primary Examiner* — Meng An
*Assistant Examiner* — Tammy Lee
(74) *Attorney, Agent, or Firm* — Canon USA, Inc. IP Division

(57) ABSTRACT

A management apparatus for managing a production apparatus that executes a plurality of processes in accordance with a production plan detects an amount of a release-forgotten memory area that is kept allocated on a memory of the production apparatus by each process even after completion of the process. The management apparatus determines an amount of remaining memory based on the detected amount of the release-forgotten memory area and retrieves a process executable with the amount of remaining memory. The management apparatus determines a process to be executed next in accordance with either a result of the retrieval executed based on the detected amount of the release-forgotten memory area or the production plan and controls the production apparatus to execute the determined process.

5 Claims, 10 Drawing Sheets

FIG. 3

● PRODUCTION PLAN INFORMATION

| 201 | 202 | 203 | 204 | 205 | 206 | 207 | 208 PARAMETER VALUE | |
|---|---|---|---|---|---|---|---|---|
| JOB NAME | JOB TYPE | PRECEDING JOB | RECIPE ID | EXPOSURE MODE | RETICLE DATA | ARRANGE-MENT | 1 ... | ... n |
| ... | ... | ... | ... | ... | ... | ... | ... ... | ... ... |
| A1 | EXPOSURE 1 | — | R010 | IL010 | RCL010 | L010 | a1 ... | ... x1 |
| B1 | EXPOSURE 2 | — | R011 | IL011 | RCL011 | L011 | a2 ... | ... x1 |
| B2 | EXPOSURE 2 | B1 | R012 | IL011 | RCL011 | L012 | a2 ... | ... x1 |
| ... | ... | ... | ... | ... | ... | ... | ... ... | ... ... |
| A2 | EXPOSURE 1 | A1 | R010 | IL010 | RCL010 | L010 | a1 ... | ... x1 |
| A3 | EXPOSURE 1 | A2 | R013 | IL012 | RCL012 | L013 | a1 ... | ... x1 |

FIG. 4

● EXECUTION PARAMETER INFORMATION

| JOB ID (211) | JOB NAME (201) | COMPLETION TIME (209) | SIZE OF MEMORY TO BE USED (212) | PARAMETER VALUE (208) | | |
|---|---|---|---|---|---|---|
| | | | | 1 | ... | n |
| ... | ... | ... | ... | ... | ... | ... |
| 010 | A1 | ... | 1024 | a1 | ... | x1 |
| 011 | A2 | ... | 1608 | a1 | ... | x1 |
| 012 | A3 | ... | 1240 | a1 | ... | x1 |
| ... | ... | ... | ... | ... | ... | ... |
| 020 | B1 | ... | 768 | a2 | ... | x2 |
| 021 | B2 | ... | 1288 | a2 | ... | x2 |
| ... | ... | ... | ... | ... | ... | ... |

FIG. 5

● RELEASE-FORGOTTEN MEMORY INFORMATION

| JOB ID (211) | JOB NAME (201) | COMPLETION TIME (209) | SIZE OF RELEASE-FORGOTTEN MEMORY (213) | PARAMETER VALUE (208) | | |
|---|---|---|---|---|---|---|
| | | | | 1 | ... | n |
| ... | ... | ... | ... | ... | ... | ... |
| 010 | A1 | 20070910T101000 | 0 | a1 | ... | x1 |
| 011 | A2 | 20070910T101000 | 512 | a1 | ... | x1 |
| 012 | A3 | 20070910T101000 | 512 | a1 | ... | x1 |
| ... | ... | ... | ... | ... | ... | ... |
| 020 | B1 | 20070910T101010 | 0 | a2 | ... | x2 |
| 021 | B2 | 20070910T101010 | 256 | a2 | ... | x2 |
| ... | ... | ... | ... | ... | ... | ... |

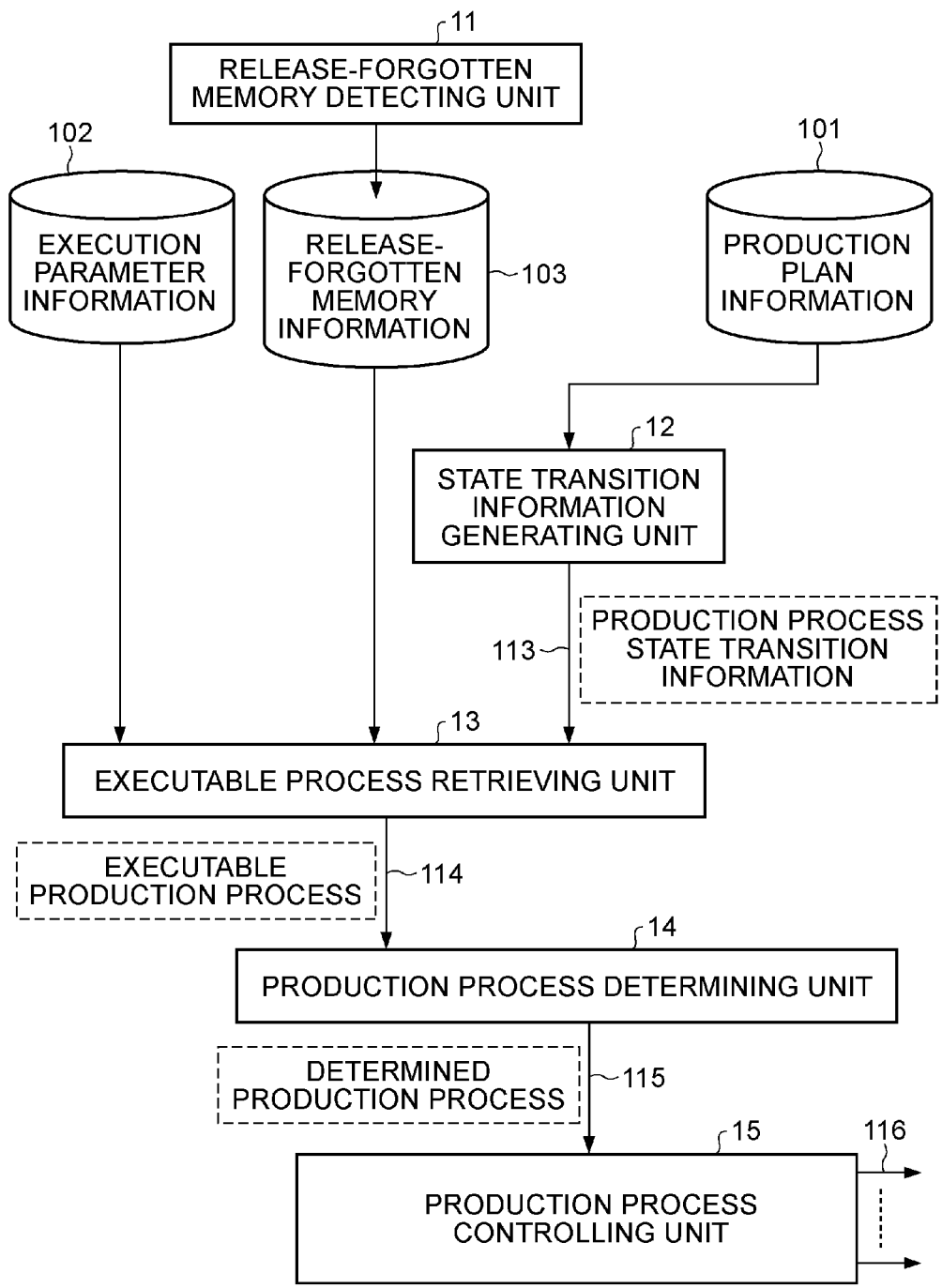

DETERMINING EXECUTABLE PROCESSES BASED ON A SIZE OF DETECTED RELEASE-FORGOTTEN MEMORY AREA AND SELECTING A NEXT PROCESS THAT ACHIEVES A HIGHEST PRODUCTION QUANTITY

BACKGROUND OF THE INVENTION

1. Field of the Invention

The present invention relates to management apparatuses and methods for controlling the same. More particularly, the present invention relates to management and control of memory areas.

2. Description of the Related Art

Memory areas for work areas and data storage areas that are temporarily used by software are not allocated permanently. Memory areas are allocated when work areas and data storage areas are needed and are released when they are no longer needed. However, there may be a case where a memory area, which is no longer needed, is not released but is kept allocated because of a defect of a program. In this case, the memory area is not used by any processes but is kept allocated until termination of a system. A phenomenon that an unnecessary memory area is not released but is kept allocated is referred to as a "memory release leak".

Since the memory release leak equates to wasting of memory resource of a system, the memory release leak has a significant influence on execution of the system. An amount of available memory decreases in response to an increase in an amount of memory forgotten to be released (hereinafter, referred to as a "release-forgotten memory"). As a result, execution performance of the software may decrease or an operation of the software may become unstable. Furthermore, if an amount of available memory is less than an amount of memory required for execution of the software, execution of the software stops since the software cannot allocate work areas and data storage areas.

However, the memory release leak is not very problematic if a ratio of release-forgotten memory areas is low, because a sufficient free space can be acquired on a memory. In addition, occurrence of the memory release leak does not result in a critical problem in a system having a short continuous operating time since the operation of the system terminates before the release-forgotten memory exerts a serious influence even if the memory release leak occurs. On the contrary, the memory release leak becomes a critical problem in a system having a long continuous operating time. This is because release-forgotten memory areas accumulate and the amount of available memory reduces as the operating time becomes longer.

Software is generally released into the market as a product after bugs are fixed in a pre-release test process. However, complete removal of bugs of the memory release leak in the pre-release test process is difficult depending on a type of the software. Such a type of software includes software employing many parameters set by users. It may be nearly impossible to carry out tests for every combination of possible parameter values in such software before the software is released into the market.

For example, software embedded in a semiconductor manufacturing apparatus (hereinafter, referred to as a semiconductor exposure apparatus) is one kind of such software that have a continuous operating time exceeding several months and employs many kinds of operation-determining parameters, which are set by users.

Semiconductor manufacturing is composed of many processes and a continuously operating time reaches several months. With an increase in a degree in integration, a driving mechanism and electronic controlling components of the semiconductor exposure apparatus have become more complicated and more accurate. Accordingly, functions of software embedded in the semiconductor exposure apparatus become complicated and the scale of the software also becomes larger. Users determine parameters of the software based on a semiconductor manufacturing procedure unique to the users. Accordingly, if a memory release leak occurs in the software of the semiconductor exposure apparatus, an amount of the release-forgotten memory areas is likely to increase. That is, a failure that execution of software stops because the software cannot allocate work areas and data storage areas is highly likely to occur.

When the software execution performance decreases or an operation of the software becomes unstable due to the memory release leak, all memory areas can be released by terminating and restarting the software. In this way, the problem can be solved. However, since the semiconductor manufacturing processes are interrelated, termination and restart of a certain process is difficult.

If a further increase in an amount of release-forgotten memory areas results in termination of the software, the users undergo a significant damage. For example, the users have to discard wafers currently being manufactured because a state of the semiconductor exposure apparatus and an environment thereof change and the manufacture cannot be continued in the same state and environment even if the software is restarted. Furthermore, since check and adjustment of actions of each driving component are required in the semiconductor exposure apparatus after the restart, the manufacture of semiconductors cannot be restarted until this adjustment work has been completed regarding all of the processes. That is, if software stops due to a memory release leak, the users suffer an economic loss for discarding half-finished products (products currently being manufactured) and a time loss for waiting for completion of adjustment of the semiconductor exposure apparatuses.

As described above, since it is extremely difficult to carry out a test regarding all of combinations of possible parameter values in such software before the software is released into the market, it may be impossible to prevent the memory release leak from occurring. Accordingly, a measure for avoiding an influence of the memory release leak has to be taken until software stops by providing a unit for detecting a memory release leak and by detecting the memory release leak using this unit. For example, programming languages, such as Java® and C#, have a garbage collection function for allowing an operating system to take care of releasing of memory areas. Additionally, regarding programming languages, such as C, not having the garbage collection function, a method for preventing the memory release leak based on memory area information is known. Regarding this technique, Japanese Patent Laid-Open No. 2000-293400 discloses a technique for storing/deleting memory area information in response to software's allocation/release of memory areas and determining whether the allocated memory area information still remains after termination of the software to detect a memory release leak. In addition, Japanese Patent Laid-Open No. 2002-108698 discloses a technique for managing a maximum existing time of memory areas allocated by software and identifying a memory area that is not released after this time period has passed as a release-forgotten memory area.

Semiconductor exposure apparatuses store parameter values and a procedure to be supplied to software in a configuration file called a recipe. This recipe is created by an operator in advance. At the time of an operation of the apparatuses, this recipe and wafers are supplied to the semiconductor exposure apparatuses and processing is executed. This processing is called a job. After the processing described in the recipe is completed regarding a specified number of wafers, the job terminates. To carry out the processing described in this recipe, a plurality of kinds of software operate in cooperation with each other in the semiconductor exposure apparatuses.

Based on this point, the technique disclosed in Japanese Patent Laid-Open No. 2000-293400 is unable to accurately detect a memory release leak when memory areas are shared by a plurality of kinds of software. Accordingly, a system, such as, for example, a semiconductor exposure apparatus, is still unable to solve the problem. Furthermore, in the technique disclosed in Japanese Patent Laid-Open No. 2000-293400, a memory release leak is simply presented to an operator upon detection of the memory release leak and a measure for avoiding an influence of the memory release leak is not discussed.

On the other hand, since release-forgotten memory areas are detected by managing the maximum existing time of memory areas allocated by software in the technique disclosed in Japanese Patent Laid-Open No. 2002-108698, a memory release leak can be detected when a plurality of kinds of software shares the memory areas. Moreover, since the release-forgotten memory areas are automatically released, a measure for avoiding an influence of the memory release leak is also provided. However, because estimation of the maximum existing time is difficult in semiconductor exposure apparatuses having a long continuous operating time, application of the technique disclosed in Japanese Patent Laid-Open No. 2002-108698 to the semiconductor exposure apparatuses is difficult.

Additionally, Japanese Patent Laid-Open No. 11-176717 discloses a production management method for reducing the number of partly-finished products (products currently being manufactured). The use of this production management method can reduce the number of partly-finished products, which have to be discarded when a trouble occurs, and thus can reduce an economic loss. However, this method cannot avoid a time loss for waiting for completion of adjustment of semiconductor exposure apparatuses.

SUMMARY OF THE INVENTION

The present invention provides a technique for detecting a memory release leak and taking countermeasures before the memory release leak exerts a critical influence.

According to an aspect of the present invention, a management apparatus of the present invention comprises the following arrangement. That is, a management apparatus for managing a production apparatus that executes a plurality of processes in accordance with a production plan includes a detecting unit configured to detect an amount of a release-forgotten memory area that is kept allocated on a memory of the production apparatus by each process even after completion of the process, a retrieving unit configured to determine an amount of remaining memory based on the amount of the release-forgotten memory area detected by the detecting unit and to retrieve a process executable with the amount of remaining memory, a determining unit configured to determine a process to be executed next in accordance with either a result of the retrieval executed by the retrieving unit based on the amount of the release-forgotten memory area detected by the detecting unit or the production plan, and a controlling unit configured to control the production apparatus to execute the process determined by the determining unit.

According to another aspect of the present invention, a method of the present invention comprises the following arrangement. That is, a method for controlling a management apparatus for managing a production apparatus that executes a plurality of processes in accordance with a production plan includes detecting an amount of a release-forgotten memory area that is kept allocated on a memory of the production apparatus by each process even after completion of the process, determining an amount of remaining memory based on the detected amount of the release-forgotten memory area and retrieving a process executable with the amount of remaining memory, determining a process to be executed next in accordance with either a result of the retrieval executed based on the detected amount of the release-forgotten memory area or the production plan, and controlling the production apparatus to execute the determined process.

Other features and aspects of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram showing an example of production plan information 101 shown in FIGS. 1 and 2.

FIG. 4 is a diagram showing an example of execution parameter information 102 shown in FIGS. 1 and 2.

FIG. 5 is a diagram showing an example of release-forgotten memory information 103 shown in FIG. 2.

FIG. 10 is a diagram showing an example of a functional configuration of a management apparatus 10 according to a modified example.

DESCRIPTION OF THE EMBODIMENTS

Various embodiments of the present invention will now be described in detail in accordance with the accompanying drawings.

A management apparatus, a method for controlling the same, and a controlling program according to exemplary embodiments of the present invention will be described in detail below with reference to the accompanying drawings. Meanwhile, in exemplary embodiments, a description will be given below for a case where a production apparatus is a semiconductor manufacturing apparatus (hereinafter, referred to as a semiconductor exposure apparatus), for example.

Figure 1:
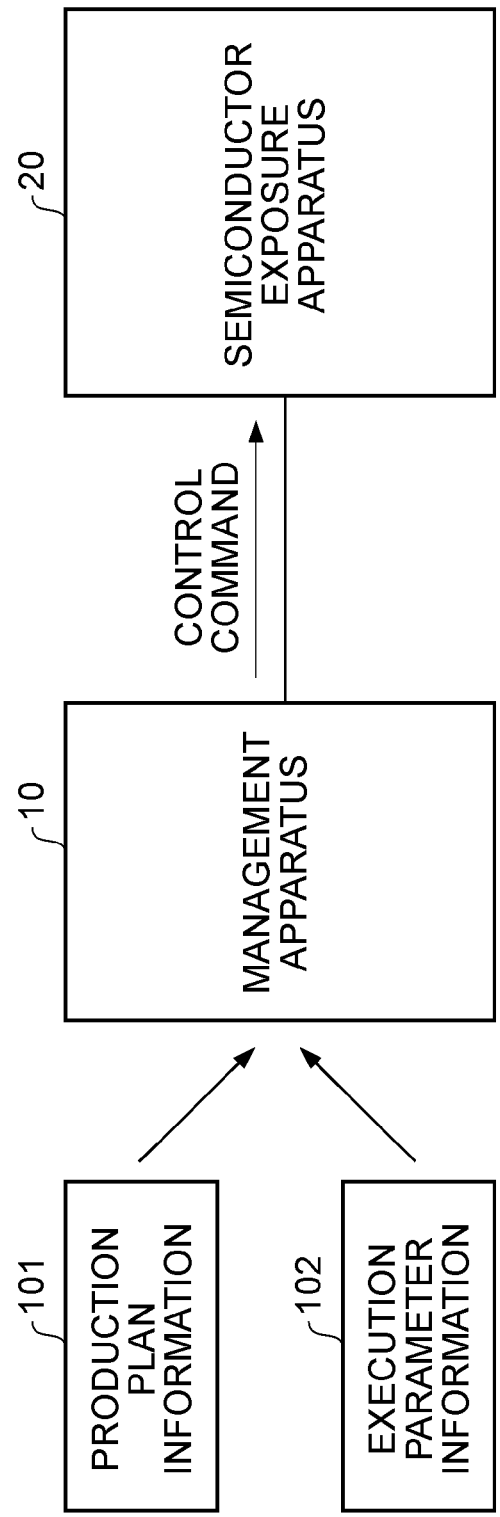
FIG. 1 is a diagram showing an example of an overall configuration of a semiconductor exposure system according to an exemplary embodiment of the present invention.

FIG. 1 is a diagram showing an example of an overall configuration of a semiconductor exposure system according to this exemplary embodiment of the present invention.

A semiconductor exposure system includes a management apparatus 10 and a semiconductor exposure apparatus 20. The management apparatus 10 and the semiconductor exposure apparatus 20 are connected to each other via a communication network, such as, for example, a local area network (LAN). A connection configuration of the management apparatus 10 and the semiconductor exposure apparatus 20 is not particularly specified as long as the apparatuses 10 and 20 are connected in a communicable manner.

The management apparatus 10 is supplied with production plan information 101 and execution parameter information 102. The management apparatus 10 generates control commands 116 based on these kinds of supplied information and outputs the generated control commands 116 to the semiconductor exposure apparatus 20. In this manner, the management apparatus 10 controls and manages processing executed in the semiconductor exposure apparatus 20.

In the production plan information 101, attribute values, such as an operation mode, a type of an employed apparatus, and parameter values, are defined for each processing (hereinafter, referred to as an exposure job) entered to the semiconductor exposure apparatus 20. The execution parameter information 102 stores execution-completed exposure jobs and parameter values used by the exposure jobs. The control commands 116 are one or more commands for controlling the semiconductor exposure apparatus 20.

The semiconductor exposure apparatus 20 projects a pattern formed on a reticle (also referred to as a mask) onto a photosensitive-material applied substrate (hereinafter, referred to as a wafer) and transfers the pattern to the wafer. Through such an exposure process, semiconductors on which a fine circuit pattern is formed are manufactured.

The description given above is regarding the overall configuration of the semiconductor exposure system. Meanwhile, each of the management apparatus 10 and the semiconductor exposure apparatus 20 includes a computer. The computer includes, for example, a main controlling unit, such as a central processing unit (CPU), and storage devices, such as a read-only memory (ROM) and a random access memory (RAM). The computer may also include a communication unit, such as a network card, and an input/output device, such as a keyboard, a display, or a touch panel. These components are connected to each other through a bus or the like. The main controlling unit executes a program stored in the storage device, thereby controlling these components.

An example of a functional configuration of the management apparatus 10 shown in FIG. 1 will now be described using FIG. 2.

The management apparatus 10 includes a release-forgotten memory detecting unit 11, a state transition information generating unit 12, an executable process retrieving unit 13, a production process determining unit 14, and a production process controlling unit 15.

The release-forgotten memory detecting unit 11 determines whether a memory area (release-forgotten memory area) that is not released but is kept allocated exists in a memory of the semiconductor exposure apparatus 20. The release-forgotten memory detecting unit 11 also detects a size of the release-forgotten memory area if such a memory area exists. That is, the release-forgotten memory detecting unit 11 detects existence of a release-forgotten memory area and the size thereof. This detection is carried out for each exposure job. More specifically, the detection operation is carried out every time execution of an exposure job has been completed. The size of the release-forgotten memory area detected by the release-forgotten memory detecting unit 11 is stored as release-forgotten memory information 103. A description regarding a method for detecting, for each exposure job, existence of a release-forgotten memory area and the size thereof is omitted herein.

The state transition information generating unit 12 generates production process state transition information 113 indicating transition of a state of a production process based on the production plan information 101. This production process state transition information 113 is generated every time the production plan information 101 is changed. Since many techniques regarding a method for generating the production process state transition information 113 exist in the related art, a description thereof is omitted. For example, a technique disclosed in Japanese Patent Laid-Open No. 2007-183737 may be employed.

The executable process retrieving unit 13 retrieves one or more production processes 114 executable with an amount of remaining memory of the semiconductor exposure device 20. This retrieval is executed based on information acquired from the execution parameter information 102, the release-forgotten memory information 103, and the production process state transition information 113. The executable process retrieving unit 13 according to this exemplary embodiment retrieves executable production processes using a binary decision diagram (BDD) search algorithm. An algorithm described in, for example, "Searching for Synchronization Algorithms using BDDs" written by Masami Hagiya and Koichi Takahashi, IPSJ transactions on programming, vol. 142, No. SIG_11 (PRO_12) (20011115), p. 92, may be employed as the BDD search algorithm. However, this search algorithm does not have to be employed and executable production processes may be retrieved using other techniques in the related art.

The production process determining unit 14 determines a production process to be executed next in the semiconductor exposure apparatus 20 on the basis of the amount of remaining memory of the semiconductor exposure apparatus 20. The production process to be executed next is determined in accordance with either the retrieval result (executable production process 114) of the executable process retrieving unit 13 or the production plan information 101.

The production process controlling unit 15 generates the control commands 116 in accordance with a production process 115 determined by the production process determining unit 14 and outputs the control commands 116 to the semiconductor exposure apparatus 20. The control commands 116 do not depend on an algorithm for generating exposure apparatus controlling commands. For example, control commands for executing an operation determined for each stage may be output by representing the production process 115 as a finite state machine (FSM) and operating this FSM.

Figure 2:
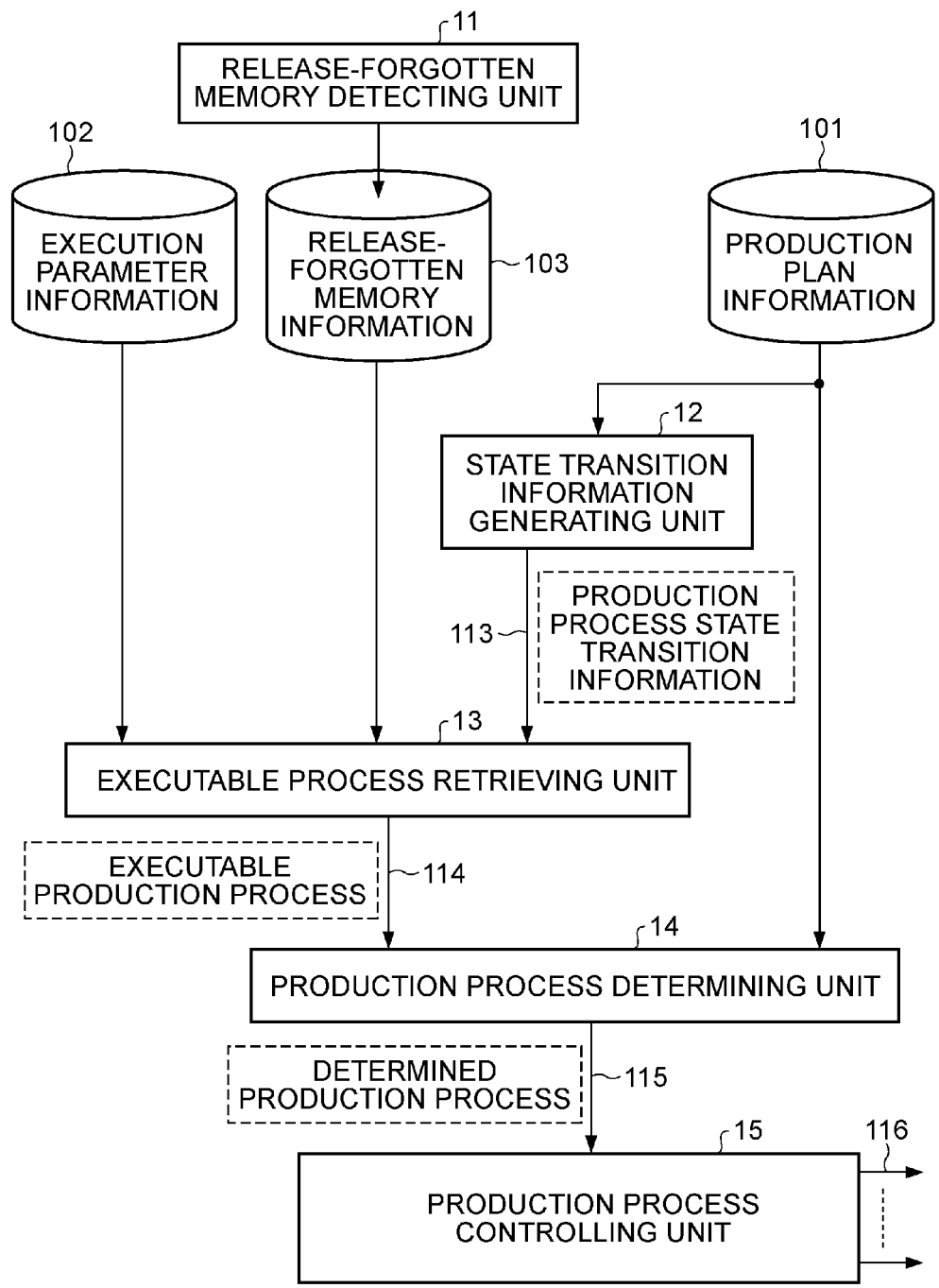
FIG. 2 is a diagram showing an example of a functional configuration of a management apparatus 10 shown in FIG. 1.

FIG. 3 is a diagram showing an example of the production plan information 101 shown in FIGS. 1 and 2.

A job type 202, a preceding job 203, a recipe ID 204, an exposure mode 205, reticle data 206, an arrangement 207, and a parameter value 208 are stored in the production plan information 101 in association with a job name 201.

The job name 201 indicates a name of an exposure job. The job type 202 indicates a type of an exposure process. The preceding job 203 indicates a precedent exposure job, namely, a precedent process. Each job is not started unless the exposure job indicated at the preceding job column has been completed.

The recipe ID 204 indicates an identifier of a recipe for use in exposure processing. A procedure of exposure processing and the number of lots to be produced are defined in the recipe. The recipe is created by, for example, an operator of the semiconductor exposure apparatus 20.

The exposure mode 205 defines an operation mode of the semiconductor exposure apparatus 20. If the semiconductor exposure apparatus 20 has only a single operation mode, the item of the exposure mode 205 may be omitted. The reticle data 206 indicates an identifier of a reticle for use in exposure processing. The arrangement 207 determines an arrangement in an exposed area on a wafer. The parameter value 208 indicates values of parameters employed in an exposure job specified by the job name 201.

Although an example of the production plan information 101 has been described above, the format and items of the production plan information 101 are not limited to this particular case. For example, if items necessary for uniquely defining an operation of an exposure job exist, the items may be added. Since the production plan information 101 is created based on a production technique of each user of the semiconductor exposure apparatus, the production plan information 101 often differs depending on the users of the semiconductor exposure apparatus 20.

FIG. 4 is a diagram showing an example of the execution parameter information 102 shown in FIGS. 1 and 2.

A job name 201, a completion time 209, a size of memory to be used 212, and a parameter value 208 are stored in the execution parameter information 102 in association with a job ID 211. The same numerals are attached to the same items as those of the production plan information 101 described in FIG. 3.

The job ID 211 indicates an identifier of a job. The completion time 209 indicates time when the job has been completed. The size of memory to be used 212 indicates a maximum memory size to be used at the time of execution of the job.

Although an example of the execution parameter information 102 has been described above, the format and items of the execution parameter information 102 are not limited to this particular case. For example, any given format and items of the execution parameter information 102 may be employed as long as the job ID 211, the job name 201, the size of memory to be used 212, and the parameter value 208 are associated with each other. New information is accumulated in the execution parameter information 102 every time an exposure job has been completed. Any given information accumulation method may be employed. For example, information accumulation may be realized using a general database. Many kinds of available database software are present in the related art.

FIG. 5 is a diagram showing an example of the release-forgotten memory information 103 shown in FIG. 2.

A size of release-forgotten memory and attributes of a job are stored for each job in the release-forgotten memory information 103. More specifically, a job name 201, a completion time 209, a size of release-forgotten memory 213, and a parameter value 208 are stored in association with a job ID 211. The same numerals are attached to the same items as those of the production plan information 101 described in FIG. 3 and those of the execution parameter information 102 described in FIG. 4.

The size of release-forgotten memory 213 indicates a size of memory that is not released but is kept allocated by the job. If no release-forgotten memory exists, the size of release-forgotten memory 213 is set equal to 0. In the release-forgotten memory information 103 shown in FIG. 5, the job name 201, the exposure job execution completion time 209, and the parameter value 208 are stored as attributes of the exposure job.

Although an example of the release-forgotten memory information 103 has been described above, the format and items of the release-forgotten memory information 103 are not limited to this particular case. For example, any given format and items of the release-forgotten memory information 103 may be employed as long as the job ID 211 and the size of the release-forgotten memory 213 are associated with each other.

Figure 6:
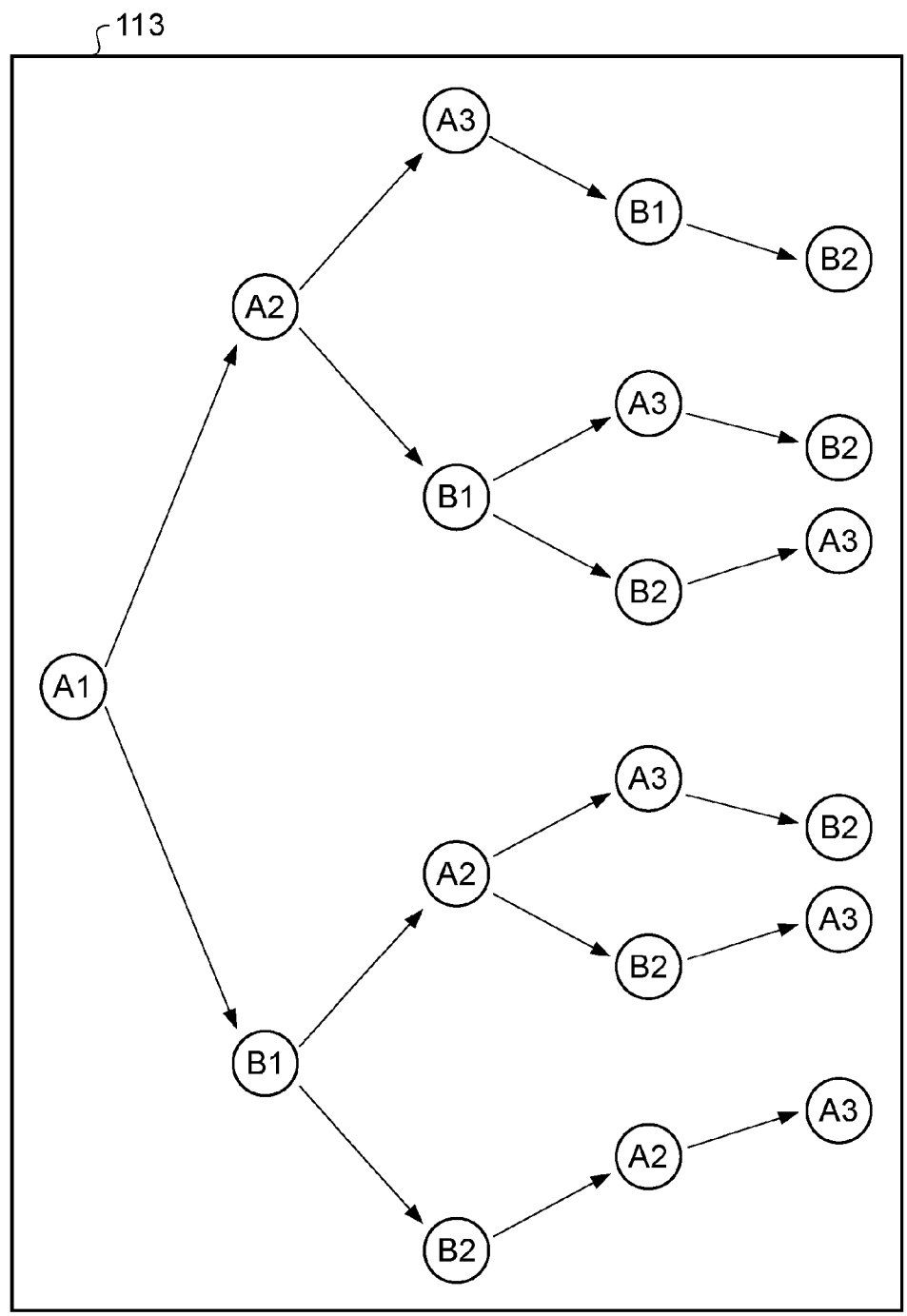
FIG. 6 is a diagram showing an example of an overview of production process state transition information 113 shown in FIG. 2.

FIG. 6 is a diagram showing an example of an overview of the production process state transition information 113 shown in FIG. 2. FIG. 6 shows a part of the production process state transition information 113 generated based on the production plan information 101 described in FIG. 3.

In the production process state transition information 113, each node represents an exposure job. A node pointed by an arrow indicates an exposure job to be executed next. For example, either a job A2 or B1 is executed after execution of a job A1. After execution of the job A2, either a job A3 or B1 is executed. Furthermore, after execution of the job A3, jobs B1 and B2 are sequentially executed.

Although the production process state transition information 113 is shown in a BDD format in FIG. 6, the format is not limited to this particular type of format. The production process state transition information 113 does not have to be represented as such a production process state transition diagram and any given format may be employed as long as the transition of the state of the production process can be uniquely defined.

Figure 7:
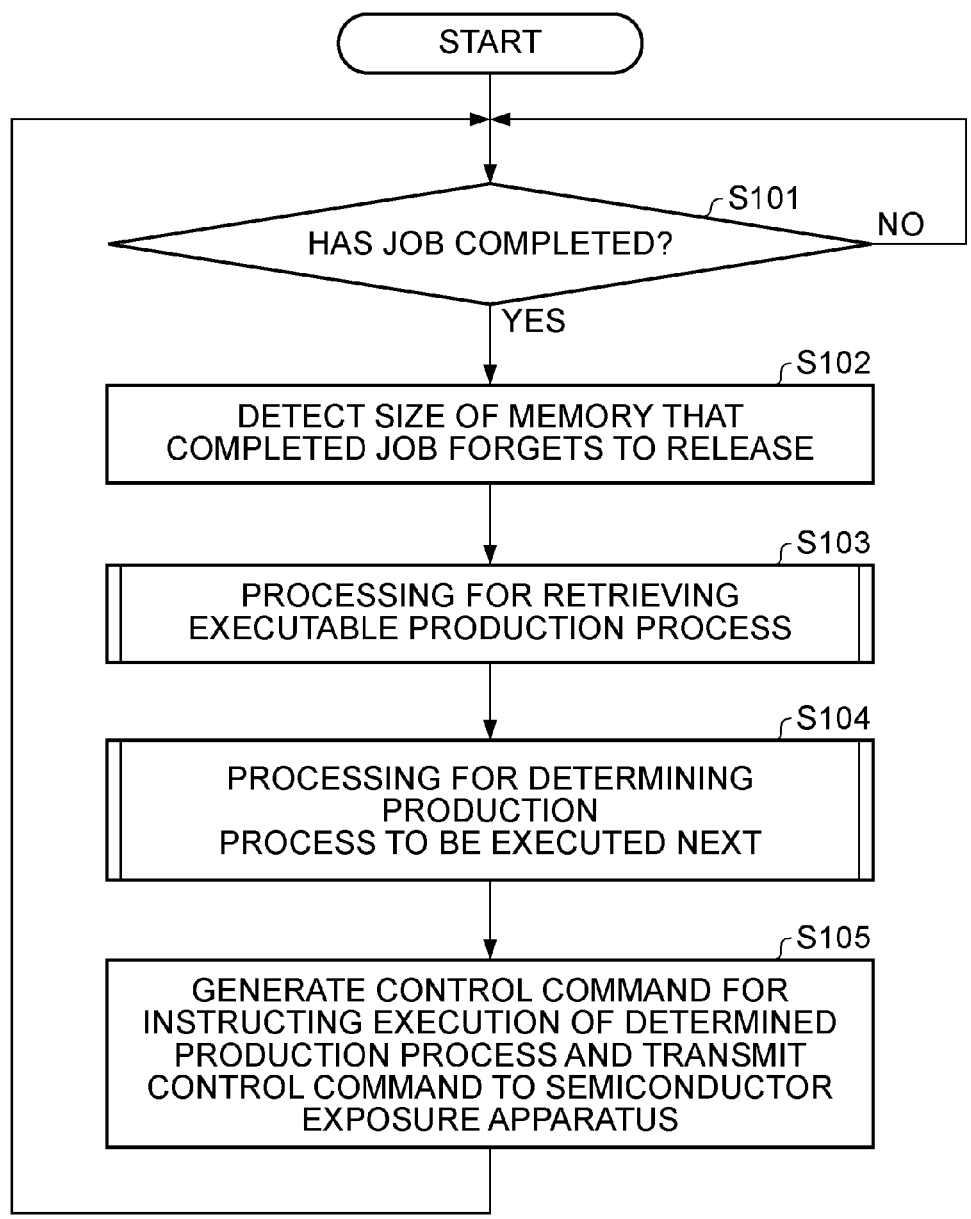
FIG. 7 is a flowchart showing an example of an operation performed in a semiconductor exposure system shown in FIG. 1.

An example of an operation executed in the semiconductor exposure system shown in FIG. 1 will now be described using FIG. 7. Here, a description will be given for a case where the semiconductor exposure apparatus 20 is executing an exposure job under the control of the management apparatus 10. In addition, it is assumed that the production process state transition information 113 has been already generated.

The management apparatus 10 is first in a state for waiting for completion of the exposure job executed by the semiconductor exposure apparatus 20 (NO at STEP S101). After the completion of the exposure job in the semiconductor exposure apparatus 20 (YES at STEP S101), the release-forgotten memory detecting unit 11 of the management apparatus 10 detects a memory area that the completed job has forgotten to release and the size of the memory area (STEP S102).

After this detection, the executable process retrieving unit 13 of the management apparatus 10 retrieves executable production processes (STEP S103). This retrieval processing will be described in detail later. The executable processes are retrieved in consideration with an amount of remaining memory of the semiconductor exposure apparatus 20.

After this retrieval, the production process determining unit 14 of the management apparatus 10 determines a production process to be executed next in the semiconductor exposure apparatus 20 (STEP S104). This determination will be described in detail later. The production process is determined based on either the retrieval result obtained at STEP S103 or the production plan information 101.

After determination of the production process to be executed next, the production process controlling unit 15 of the management unit 10 generates a control command for instructing execution of the determined production process and transmits the generated command to the semiconductor exposure apparatus 20 (STEP S105). The process then returns to STEP S101 and the management apparatus 10 waits for completion of the instructed exposure job.

An example of processing executed to retrieve an executable production process at STEP S103 will be described. As described above, this processing is executed by the executable process retrieving unit 13.

The management apparatus 10 previously stores an upper limit value (MAX_MEM) of a total amount of memory used by operating software and a retrieval distance D in, for example, a ROM or the like. The upper limit value MAX_MEM is set to a value not causing software execution performance to decrease, not causing the operation of the software to become unstable, or not causing the execution of the software to stop. This upper limit value MAX_MEM depends on an amount of memory of the semiconductor exposure apparatus 20 and a specification of an operating system (OS). The executable process retrieving unit 13 performs a retrieval operation while targeting transitable nodes within the distance D from a node of the exposure job currently being executed as a retrieval range. The executable process retrieving unit 13 retrieves a node satisfying "Equation 1" within the retrieval range.

$$CLEAK + ALEAK + UMEM < MAX\_MEM \quad \text{(Equation 1)}$$

CLEAK: A sum of amounts of current release-forgotten memories
UMEM: An amount of memory to be used by an exposure job of a retrieval target node
LMEM: An amount of release-forgotten memory caused by an exposure job of a retrieval target node
ALEAK: A sum of amounts of release-forgotten memories caused in a path from a node of an exposure job currently being executed to a retrieval target node (excluding LMEM caused by the retrieval target node)

The sum of amounts of release-forgotten memories represented as CLEAK is a value based on the detection result of the release-forgotten memory detecting unit 11.

Figure 8:
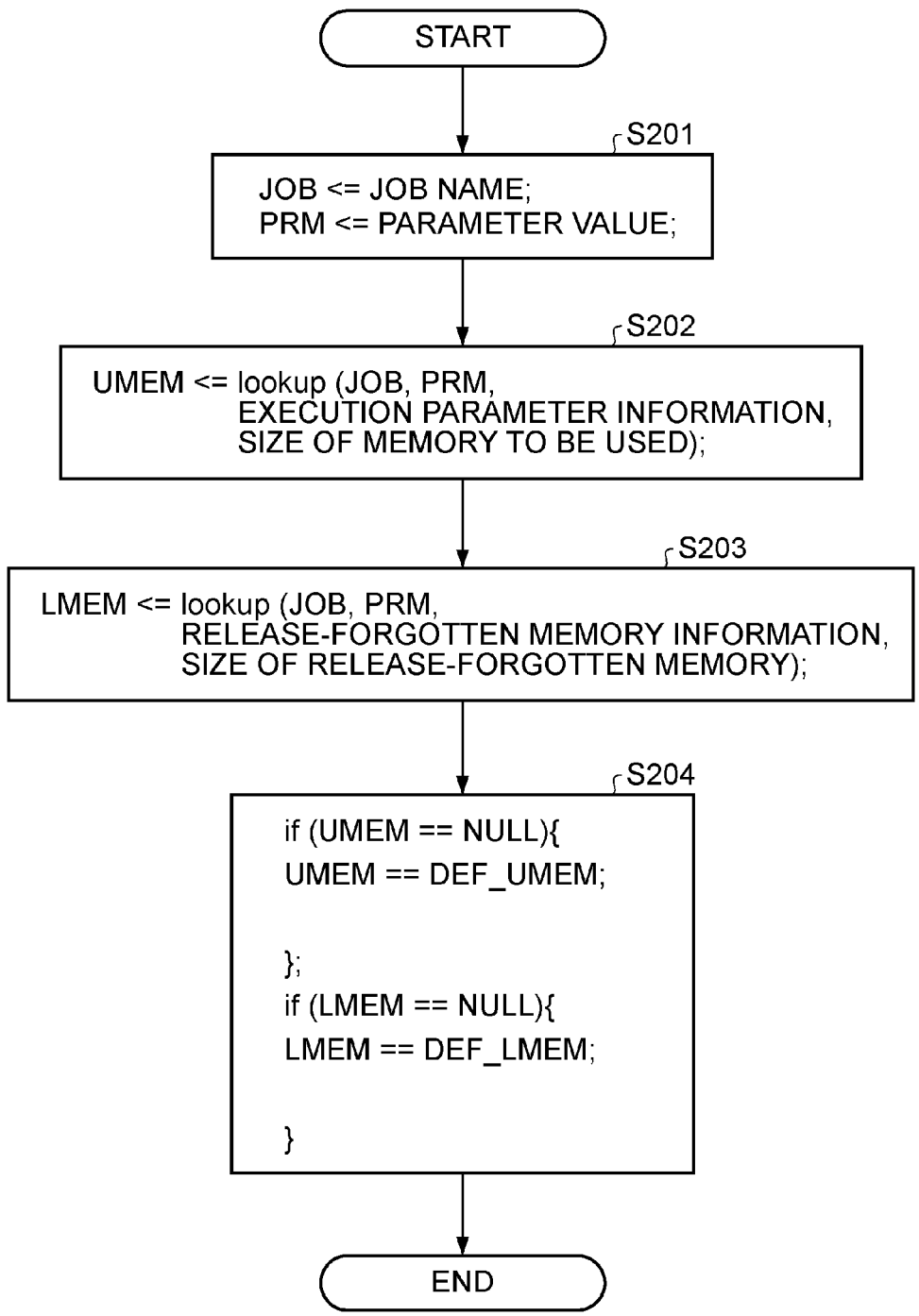
FIG. 8 is a flowchart showing an example of processing executed to retrieve executable production processes at STEP S103 shown in FIG. 7.

An example of a procedure of determining the amount of memory to be used (UMEM) and the amount of release-forgotten memory (LMEM) will now be described using FIG. 8. Here, DEF_UMEM is a predetermined value of UMEM, whereas DEF_LMEM is a predetermined value of LMEM. The values DEF_UMEM and DEF_LMEM are defined previously. A function lookup has the following feature.
<Format> lookup (Key 1, Key 2, Retrieval Target, Selection Item)
<Function> The function retrieves a record satisfying the key 1 and key 2. If the record satisfying the key 1 and key 2 exists, the function returns the value of the selection item. If the record satisfying the key 1 and key 2 does not exist, the function returns NULL.

First, the exposure job name 201 of a retrieval target node and the parameter value 208 are set in variables JOB and PRM (STEP S201), respectively. The function lookup is then executed to retrieve the execution parameter information 102 and determine the amount of memory to be used (UMEM) (STEP S202). The function lookup is executed again to retrieve the release-forgotten memory information 103 and determine the amount of release-forgotten memory (LMEM) (STEP S203).

As a result, if the value UMEM is NULL, the value UMEM is set equal to DEF_UMEM. Similarly, if the value LMEM is NULL, the value LMEM is set equal to DEF_LMEM (STEP S204).

A variable ALEAK used in "Equation 1" will now be described.

The variable ALEAK indicates a sum of amounts of release-forgotten memories. More specifically, the variable ALEAK indicates a sum of amounts of release-forgotten memories caused in a path from a node of an exposure job currently being executed to a retrieval target node. Accordingly, this value increases as exposure jobs are executed. When a node is switched from the current node to a following retrieval target node, the variable ALEAK is determined by adding a value of LMEM using Equation 2.

$$ALEAK = ALEAK + LMEM \quad \text{(Equation 2)}$$

An exposure job of a node satisfying "Equation 1" can be executed without causing a failure even if an amount of release-forgotten memory (ALEAK) increases thereafter. In this way, transition from the node of the exposure job currently being executed to a node satisfying the above condition is determined as the executable production process 114.

Figure 9:
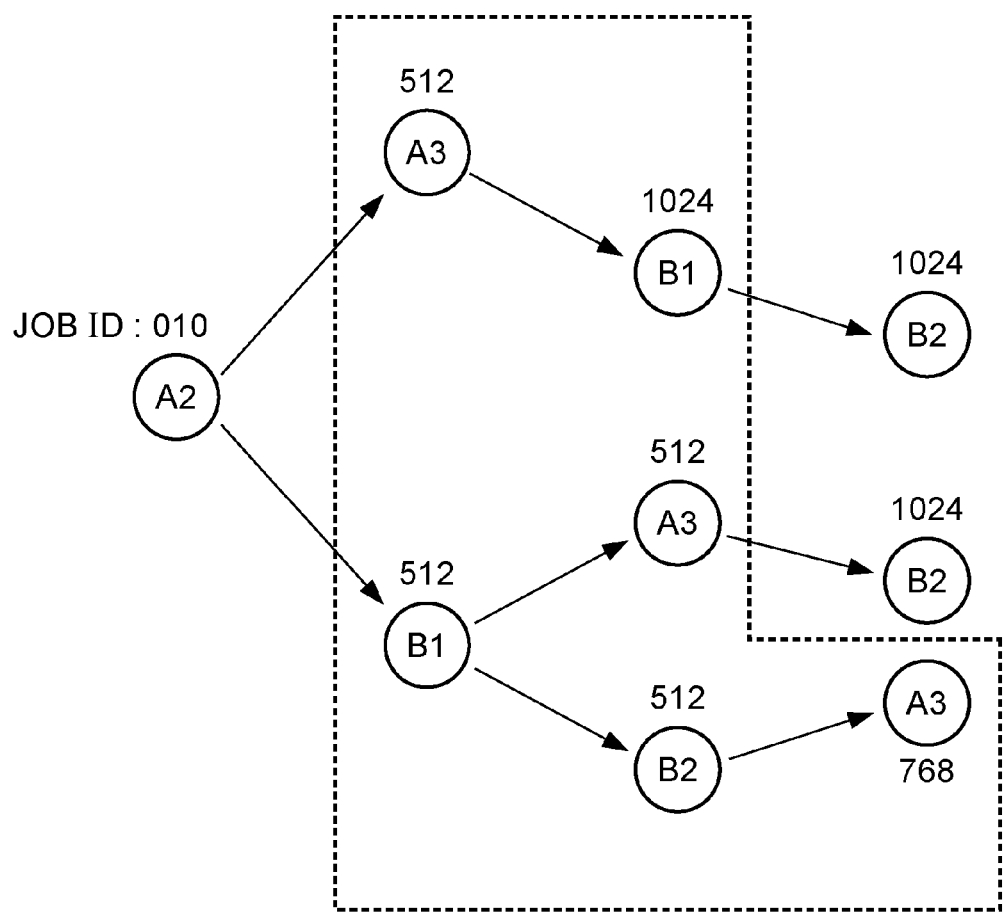
FIG. 9 is a diagram for describing a specific example of processing shown in FIG. 7.

A specific example of processing executed by the above-described executable process retrieving unit 13 will now be described using FIG. 9. Here, it is assumed that the job ID of the job currently being executed is 010 and MAX_MEM, D, and CLEAK are set equal to 2048, 3, and 0, respectively. Referring to FIG. 9, a numeral attached over or below each node indicates a value of ALEAK, whereas a range surrounded by a broken line indicates a range satisfying "Equation 1".

Values of CLEAK and ALEAK of a node 301, not shown, are equal to 0 and 512, respectively. Additionally, an amount of memory to be used by the exposure job A3 is equal to 1200 based on the execution parameter information 102 shown in FIG. 4. Accordingly, $$0 + 512 + 1240 = 1752 < 2048$$

is determined and this result satisfies the condition of "Equation 1". Thus, the node 301 is an executable exposure job.

Similarly, regarding a node 302, not shown, $$0 + 1024 + 768 = 1792 < 2048$$

is determined and this result satisfies the condition of "Equation 1". Thus, the node 302 is an executable exposure job.

On the contrary, regarding a node 303, not shown, $$0 + 1024 + 1288 = 2312 > 2048$$

is determined and this result does not satisfy the condition of "Equation 1". Thus, the node 303 is not an executable exposure job at this point.

An example of processing executed to determine a production process at STEP S104 will now be described. As described above, this processing is executed by the production process determining unit 14.

The production process determining unit 14 determines a production process to be executed in accordance with either the production plan information 101 or the executable production processes 114 and outputs the determined production process 115 to the production process controlling unit 15.

A threshold LT for an amount of release-forgotten memory is previously set in the production process determining unit 14.

```
if (CLEAK < LT) {
    select a production process defined by the production
plan information 101
} else {
    select a production process expected to achieve the
highest production quantity from the executable production
processes 114
}
```

In this case, if the value CLEAK does not exceed the threshold LT, a production process to be executed next is selected from production processes defined in the production plan information 101. On the other hand, if the value CLEAK exceeds the threshold LT, a production process expected to achieve the highest production quantity is selected from the executable production processes 114 retrieved by the executable process retrieving unit 13. More specifically, unless the amount of release-forgotten memory (CLEAK) exceeds the threshold LT, the production process is carried out in accordance with the originally defined production plan information 101. Meanwhile, the production process expected to achieve the highest production quantity indicates, for example, a production process that has the highest production quantity of each job or the largest number of produced lots defined in a recipe specified by the recipe ID 204.

As described above, according to this exemplary embodiment, a production plan is dynamically changed based on the memory release leak and production plan information before an amount of release-forgotten memory exerts a critical influence. This eliminates the chances of discarding half-finished products and rebooting an apparatus because of the memory release leak. Accordingly, a production cost can be decreased. In addition, price competitive products resulting from the decrease in the production cost can be released into the market in response to a demand of the market.

Although an example of a representative embodiment of the present invention has been described above, the present invention is not limited to the embodiment described above and the accompanying drawings and can be appropriately modified within a scope not departing from the spirit thereof.

For example, the production process to be executed next is selected in accordance with the production plan information depending on circumstances in the above description. However, the present invention does not have to be configured in this manner. For example, a configuration shown in FIG. 10 may be employed. A production process determining unit 14 may select a production process to be executed next from executable production processes 114 retrieved by an executable process retrieving unit 13. In this case, the production process determining unit 14 selects a production process expected to achieve the highest production quantity from the executable production processes 114.

Additionally, the description has been given above for a case where the management apparatus 10 and the semiconductor exposure apparatus 20 are separate apparatuses for example, the present invention is not limited to such a configuration. For example, the management apparatus 10 may be included in the semiconductor exposure apparatus 20.

The present invention may be embodied as, for example, a system, an apparatus, a method, or a program stored in a recording medium. More specifically, the present invention may be applied to a system constituted by a plurality of devices or an apparatus constituted by a single device.

Additionally, a software program may be supplied to a system or an apparatus directly or from a remote place and a computer included in the system or the apparatus reads out and executes program codes of the supplied software program, whereby the functions of the exemplary embodiment are achieved. Such a case is also included in the present invention. In this case, the supplied computer program corresponds to the flowcharts shown in the drawings in the exemplary embodiment.

Accordingly, the program code to be installed in the computer to realize the functions of the present invention in the computer is also included in the present invention. That is, the present invention includes a computer program for realizing the functions of the present invention. In this case, the computer program may be in any form, such as an object code, a program executed by an interpreter, or script data supplied to an OS, as long as the program has the functions of the program.

Types of a computer-readable recording medium for use in supplying the computer program include, for example, a floppy disk, a hard disk, an optical disc such as a CD-ROM, CD-R, CD-RW, or a DVD (DVD-ROM, DVD-R), a magneto-optical disk such as an MO, a magnetic tape, and a nonvolatile memory card.

In addition, the program supplying method includes a case where a user accesses an Internet web site using a browser of a client computer and downloads the computer program according to an exemplary embodiment of the present invention to a recording medium, such as a hard disk, from the web site. In this case, the downloaded program may be a compressed file having an automatic installation function. Additionally, program codes constituting the program according to the exemplary embodiment of the present invention may be divided into a plurality of files and each of the plurality of files may be downloaded from different web sites, whereby the present invention can be realized. That is, the present invention also includes a WWW server that allows a plurality of users to download program files for realizing the functions of the present invention in a computer.

The program according to the exemplary embodiment of the present invention may be encrypted and recorded on a recording medium, such as a CD-ROM, and the recording medium may be distributed to users. In this case, users satisfying a predetermined condition may be permitted to download key information for decrypting the encryption from a web site via the Internet, execute the encrypted program using the key information, and install the program in a computer.

In addition to realization of the functions according to the above-described exemplary embodiment by the computer's execution of the read out program code, an operating system running on the computer may execute part of or all of actual processing on the basis of instructions of the program code, whereby the functions of the exemplary embodiment may be realized. In this case, the OS or the like execute part of or all of actual processing and the function of the above-described embodiment is realized by the processing.

Furthermore, the program read out from a recording medium may be written in a memory of a function expansion board inserted into the computer or a function expansion unit connected to the computer, whereby some of or all of the functions of the above-described exemplary embodiment may be realized. In this case, a CPU or the like included in the function expansion board or the function expansion unit may execute part of or all of actual processing on the basis of instructions of the program after the program is written in the memory of the function expansion board or the function expansion unit.

As many different embodiments of the present invention can be made without departing from the spirit and scope thereof, it is to be understood that the invention is not limited to the specific embodiments thereof except as defined in the claims.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-198620 filed Jul. 31, 2008, which is hereby incorporated by reference herein in its entirety.

What is claimed is:

1. A management apparatus for managing a production apparatus that executes a plurality of processes in accordance with a predetermined production plan, the management apparatus comprising:
a processor; and
a memory having instructions that, when executed by the processor, cause the processor to perform operations comprising:
detecting an amount of a release-forgotten memory area that is kept allocated on a memory of the production apparatus by each process after completion of the process;
determining executable processes on basis of a sum of a size of the detected release-forgotten memory area in the production apparatus;
performing a retrieval of one of the executable processes;
determining a next process to be executed by selecting the next process from a process based on a result of the retrieval and a process based on the predetermined production plan; and
controlling the production apparatus to execute the next process;
wherein determining the next process in accordance with the result of the retrieval comprises selecting, from the executable processes, the next process as one expected to achieve a highest production quantity.

2. The apparatus according to claim 1, wherein the operations further comprises:
generating state transition information indicating state transition of the processes based on the production plan,
wherein performing the retrieval comprises retrieving the one of the executable processes further based on the generated state transition information.

3. The apparatus according to claim 1, wherein the production apparatus is a semiconductor manufacturing apparatus.

4. A method executed by a processor for controlling a management apparatus for managing a production apparatus that executes a plurality of processes in accordance with a predetermined production plan, the method comprising:
detecting an amount of a release-forgotten memory area that is kept allocated on a memory of the production apparatus by each process after completion of the process;
determining executable processes on basis of a sum of a size of the detected release-forgotten memory area in the production apparatus;
performing a retrieval of one of the executable processes;
determining a next process to be executed by selecting the next process from a process based on a result of the retrieval and a process based on the predetermined production plan; and
controlling the production apparatus to execute the next process;
wherein determining the next process in accordance with the result of the retrieval comprises selecting, from the executable processes, the next process as one expected to achieve a highest production quantity.

5. A non-transitory computer-executable storage medium encoded with a program for executing a method for controlling a management apparatus for managing a production apparatus that executes a plurality of processes in accordance with a production plan, the method comprising:
detecting an amount of a release-forgotten memory area that is kept allocated on a memory of the production apparatus by each process after completion of the process;
determining executable processes on basis of a sum of a size of the detected release-forgotten memory area in the production apparatus;
performing a retrieval of one of the executable processes;
determining a next process to be executed by selecting the next process from a process based on a result of the retrieval and a process based on the predetermined production plan; and
controlling the production apparatus to execute the next process;
wherein determining the next process in accordance with the result of the retrieval comprises selecting, from the executable processes, the next process as one expected to achieve a highest production quantity.

* * * * *